US011692231B2

(12) United States Patent
Desai et al.

(10) Patent No.: US 11,692,231 B2
(45) Date of Patent: Jul. 4, 2023

(54) PROCESS AND SYSTEM FOR STEEL AND HYDROGEN PRODUCTION USING RECYCLED FERROUS SCRAP AND NATURAL GAS

(71) Applicant: Palo Alto Research Center Incorporated, Palo Alto, CA (US)

(72) Inventors: Divyaraj Desai, Hayward, CA (US); Jessica Louis Baker Rivest, Palo Alto, CA (US); Dane Andrew Boysen, Anchorage, AK (US); Rahul Pandey, San Jose, CA (US); Eugene Shin Ming Beh, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/663,152

(22) Filed: May 12, 2022

(65) Prior Publication Data

US 2022/0275466 A1 Sep. 1, 2022

Related U.S. Application Data

(62) Division of application No. 16/560,627, filed on Sep. 4, 2019.

(51) Int. Cl.
*C21B 13/00* (2006.01)
*C01B 3/00* (2006.01)

(52) U.S. Cl.
CPC ........ *C21B 13/0013* (2013.01); *C01B 3/0031* (2013.01); *C01B 2203/06* (2013.01); *C21B 2400/032* (2018.08)

(58) Field of Classification Search
CPC .......... C21B 13/0013; C21B 2400/032; C21B 2100/44; C21B 13/0073; C21B 2100/28; C01B 3/0031; C01B 2203/06; C01B 3/24; C01B 2203/043; C01B 2203/049;
(Continued)

(56) References Cited

U.S. PATENT DOCUMENTS 6,110,239 A 8/2000 Malone et al.
2002/0078795 A1* 6/2002 Shigehisa ........... C21B 13/0073
266/176
(Continued)

FOREIGN PATENT DOCUMENTS

GB 2467292 A * 7/2010 ............... C01B 3/12

OTHER PUBLICATIONS

Goldfarb, Daniel, "Why does carbon alloy with iron specifically?", Physics Stack Exchange (Year: 2014).*
(Continued)

*Primary Examiner* — Brian D Walck
*Assistant Examiner* — Danielle Carda

(57) ABSTRACT

A method for producing a homogenous molten composition and a fluid product is disclosed. For example, the method includes producing a first molten metal composition in an enclosed volume, contacting a hydrocarbon reactant with the first molten metal composition, decomposing the hydrocarbon reactant into at least one fluid product and carbon, forming a metal alloy from a mixture of the carbon and the first molten metal composition, and separating a homogenous second molten composition from the metal alloy.

16 Claims, 4 Drawing Sheets

(58) Field of Classification Search
CPC ...... Y02E 60/32; Y02P 10/134; Y02P 10/143; Y02P 10/20; C21C 5/562; C21C 5/567
USPC .......................................................... 75/529
See application file for complete search history.

(56) References Cited

U.S. PATENT DOCUMENTS

2009/0224210 A1* 9/2009 Collins ...................... C10J 3/57
422/600
2019/0055173 A1 2/2019 Desai et al.

OTHER PUBLICATIONS

Ophardt, Charles, Boiling Points and Structures of Hydrocarbons, Virtual Chembook, Elmhurst College (Year: 2003).

* cited by examiner

PROCESS AND SYSTEM FOR STEEL AND HYDROGEN PRODUCTION USING RECYCLED FERROUS SCRAP AND NATURAL GAS

CROSS REFERENCE TO RELATED APPLICATIONS

This application is a divisional of U.S. patent application Ser. No. 16/560,627, filed on Sep. 4, 2019, which is hereby incorporated by reference in its entirety.

FIELD OF THE DISCLOSURE

The present disclosure relates generally to steel and hydrogen production and relates more particularly to a process and system for steel and hydrogen production using recycled ferrous scrap and natural gas.

BACKGROUND

The regional abundance of low-cost methane (e.g., 13.1 Tm³ in 2017) could be harnessed for low-cost heat, electricity, or hydrogen ($H_2$) production if new technologies are developed to mitigate its greenhouse gas footprint (>1.5 Tt/y). Steam methane reforming (SMR) uses natural gas and steam to produce $H_2$ under elevated pressure and temperature (e.g., $CH_4+H_2O \Rightarrow CO_2+4H_2$). The cost of $H_2$ production using $3/GJ natural gas is approximately $1.25/kg $H_2$. Domestically, almost 10 Mt/y $H_2$ produced via SMR is responsible for annual emission of 100 Mt/y $CO_2$, corresponding to approximately 2% of domestic emissions.

Globally, $H_2$ production (60 Mt/y $H_2$) is achieved by using fossil fuel feedstock for steam reforming (SMR, 48%), partial oxidation (PDX, 30%) and coal gasification (CG, 18%), but emits >700 Mt/y $CO_2$, also corresponding to 2% of the global $CO_2$ emissions. Market research indicates a preference for reduced emissions and high purity $H_2$ (CO+$CO_2$<10 ppm), driven by the increasing demand for fuel cell systems. This has caused research exploration into low-emissions processes, such as water electrolysis or systemic carbon capture. However, these routes are energy-intensive and cost-prohibitive. Carbon sequestration and storage systems are challenged by the absence of carbon credits and geological constraints. Consequently, there is currently no commercially mature technology that can produce emissions-free hydrogen at cost-parity with steam reforming.

Due to its low density, transportation costs ($1-2/kg $H_2$), compression, storage, and dispensing costs ($2-3/kg $H_2$) have a substantial impact on the price paid by the user, which is currently in excess of $10/kg $H_2$. Techno-economic analysis of the $H_2$ supply chain has predicted benefits of distributed $H_2$ generation. A network of distributed $H_2$ production sites (5,000 t/y $H_2$) could disrupt centralized generation using steam reforming (SMR) if production cost could be reduced to be comparable with SMR (approximately $1 per kg $H_2$). However, distributed SMR as well as $H_2$ electrolysis are too capital-intensive to disrupt $H_2$ production in centralized facilities. Assuming established scaling relationships for process equipment, distributed $H_2$ production is expected to cost greater than $2.50/kg $H_2$ in distributed facilities. Innovative approaches capable of achieving a $H_2$ cost subsidy through valorization of a secondary product are being considered as a means of substantially reducing $H_2$ production costs.

Methane pyrolysis ($CH_4 \rightarrow C+2H2$) is an energy-efficient and emissions-free approach to $H_2$ production, but stoichiometrically disadvantaged relative to steam reforming. This additional feedstock requirement makes it challenging for methane pyrolysis to be commercially viable relative to SMR. Non-catalytic methane pyrolysis requires high operating temperatures (>1400° C.) due to the large activation energy (approximately 400 kJ mol-1). Past efforts at methane pyrolysis using solid catalysts (e.g., Ni, Fe, or Co) to reduce operating temperature have a lowered activation energy barrier, but are rapidly deactivated due to carbon buildup (coking). The use of molten metals for pyrolysis enables carbon separation, but suffers from poor catalytic activity due to the higher activation energy towards methane pyrolysis (356-392 kJ mol-1). Catalytically active molten alloys for methane pyrolysis have been reported, but achieving a low $H_2$ cost is challenging due to the low reactor throughput and high volatility of identified alloying elements (e.g., Bi, Sn). This results in substantially higher capital and operating costs and a commercially non-viable $H_2$ price.

Hydrogen production costs could be offset by valorizing the carbon produced by methane pyrolysis. Since methane pyrolysis results in a C:$H_2$ weight ratio of 3:1, large carbon markets are desirable to achieve an adequate $H_2$ production cost offset. The commercially valuable carbon morphologies in order of decreasing value include diamond, graphene, carbon nanotubes (CNTs), carbon nanofibers (CNFs), carbon fibers (CF), needle coke, graphite, carbon black, coke, and coal. However, the demand for carbon products remains inversely correlated to its price—the market for the higher value products (e.g., carbon fiber, graphene) is too miniscule to afford a significant price offset. On the other hand, the demand for metallurgical coke used for steelmaking is substantially larger. This incentivizes the possible use of methane pyrolysis for steelmaking through carbon valorization as coke. However, the overall cost offset to $H_2$ production is still too low to drive technology adoption.

Primary steelmaking is one of the largest industries in the world, and 1688 Mt/y crude steel is produced through directed reduction of iron ore (DRI) to produce pig iron and calcium silicate slag in a blast furnace:

$$2.5Fe_2O_3+4.75C+yCaCO_3 \rightarrow Fe_5C+3.75CO_2$$

The pig iron produced in the blast furnace is subsequently de-carbonized in a basic oxygen furnace:

$$2Fe_5C+O_2 \rightarrow Fe_{10}C+CO_2$$

These processes are performed together at an integrated steel mill:

$$5Fe_2O_3+9.5C+O_2 \rightarrow Fe_{10}C+8.5CO_2$$

Integrated steel mills are associated with high emissions (1.815 t/t $CO_2$ per steel), and are responsible for approximately 8% of global $CO_2$ emissions. The typical process uses coal, iron ore and limestone as raw materials. The overall process is highly capital-intensive (>$1,000/t-y steel), and requires the use of large centralized facilities (>1 Mt/y steel) to achieve cost-competitiveness. Even at a centralized facility, the price of iron ore and coke prices has a major impact on steel production costs (Table 1 shown below), which is a driver for the adoption of environmentally benign, scalable approaches to steel production.

TABLE 1

Comparison of steel production cost using DRI and EAF processes.

| ITEM | BOF ($/T steel) | EAF ($/t steel) |
|---|---|---|
| Iron Ore | 105 | — |
| Coal | 120 | — |
| Steel scrap | 40 | 305 |
| Ferroalloys | 15 | 25 |
| Oxygen | 15 | 2 |
| Flux | 25 | 5 |
| Refractory | 5 | 8 |
| Electrodes | — | 20 |
| Electricity | 10 | 40 |
| Labor | 20 | 10 |
| Capital | 30 | 15 |
| Total | $370 | $430 |

The capital-intensiveness of integrated steel production has motivated the development of alternative technologies, specifically the use of lower cost ($300/t-y steel) electric arc furnace (EAF) process of directly melting steel scrap to produce steel products. The reduced capital cost of EAF steelmaking has spurred the development of modular mini-mills (0.1-1 Mt/y steel). However, the price of scrap metal relative to the iron ore and coal drives the selection of either process.

The high $CO_2$ intensity of the DRI process has prompted exploration of alternative reductants such as natural gas and $H_2$. In this case, natural gas or hydrogen replaces the coke used in the DRI process. These reductants are blown directly into the tuyeres of the blast furnace and the while the individual reactions are dependent on local temperature and composition within the blast furnace, the overall reactions are represented below:

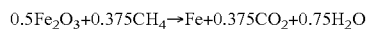

$$0.5Fe_2O_3 + 0.375CH_4 \rightarrow Fe + 0.375CO_2 + 0.75H_2O$$

$$0.5Fe_2O_3 + 1.5H_2 \rightarrow Fe + 1.5H_2O$$

In case of the ThyssenKrupp (TK) process, the required $H_2$ is produced ($2,000/t $H_2$) with modest $CO_2$ emissions (10 t/t $CO_2$ per $H_2$) using a centralized steam reformer and can achieve lower overall $CO_2$ emissions. The emissions intensity is dependent on the enthalpy of the reaction, and a thermodynamic comparison between different approaches is shown in Table 2 below. The preferred process depends on a combination of CCS costs and emission regulations. Currently, there is no commercial process capable of achieving zero $CO_2$ emissions at cost-parity with the existing approaches.

SUMMARY

According to aspects illustrated herein, there are provided a method and reactor for producing steel and hydrogen. One disclosed feature of the embodiments is a method comprising producing a first molten metal composition in an enclosed volume, contacting a hydrocarbon reactant with the first molten metal composition, decomposing the hydrocarbon reactant into at least one fluid product and carbon, forming a metal alloy from a mixture of the carbon and the first molten metal composition, and separating a homogenous second molten composition from the metal alloy.

Another disclosed feature of the embodiments is a reactor for producing steel and hydrogen. The reactor comprises an enclosed volume, a first inlet to feed a metal composition into the enclosed volume, a second inlet to feed a hydrocarbon reactant into the enclosed volume, and a heat source to melt the metal composition into a first molten metal composition and decompose the hydrocarbon reactant into at least one fluid product and carbon, wherein a metal alloy is formed from a mixture of the carbon and the first molten metal composition, wherein a homogenous second molten composition is separated from the metal alloy.

Another disclosed feature of the embodiments is another method for producing a powdered carbon-containing alloy and hydrogen. In one embodiment, the method comprises heating iron that is comminuted and a metal inside of an enclosed volume to produce a first molten alloy comprising iron and the metal, feeding methane gas into the enclosed volume, heating the enclosed volume to approximately 1000 to 1500 degrees Celsius to decompose the methane gas into a carbon saturated ternary alloy and hydrogen gas, wherein the carbon saturated ternary alloy comprises the iron, carbon, and at least 1 atomic percent of the metal, and phase-separating the carbon saturated ternary alloy into a carbon-containing alloy and the metal.

BRIEF DESCRIPTION OF THE DRAWINGS

The teaching of the present disclosure can be readily understood by considering the following detailed description in conjunction with the accompanying drawings, in which.

TABLE 2

Thermodynamic assessment of coal (C), natural gas ($CH_4$), and $H_2$ used as reductants in blast furnaces for direct reduction of iron ore.

| Feedstock | C | $CH_4$ | $H_2$ |
|---|---|---|---|
| Reaction | $2Fe_2O_3 + 3C \rightarrow 4Fe + 3CO_2$ | $2Fe_2O_3 + 1.5CH_4 \rightarrow 4Fe + 1.5CO_2 + 3H_2O$ | $2Fe_2O_3 + 6H_2 \rightarrow 4Fe + 6H_2O$ |
| Enthalpy of reaction (GJ/t Fe) | 2.1 | 1.40 | −0.30 |
| Feedstock use (kg/t Fe) | 231 | 140 | 53 |
| Emissions (t/t $CO_2$ per steel) | 0.85 | 0.385 | 0 |
| Feedstock cost ($/t Fe) | 28 | 13 | 106 |

Figure 3:
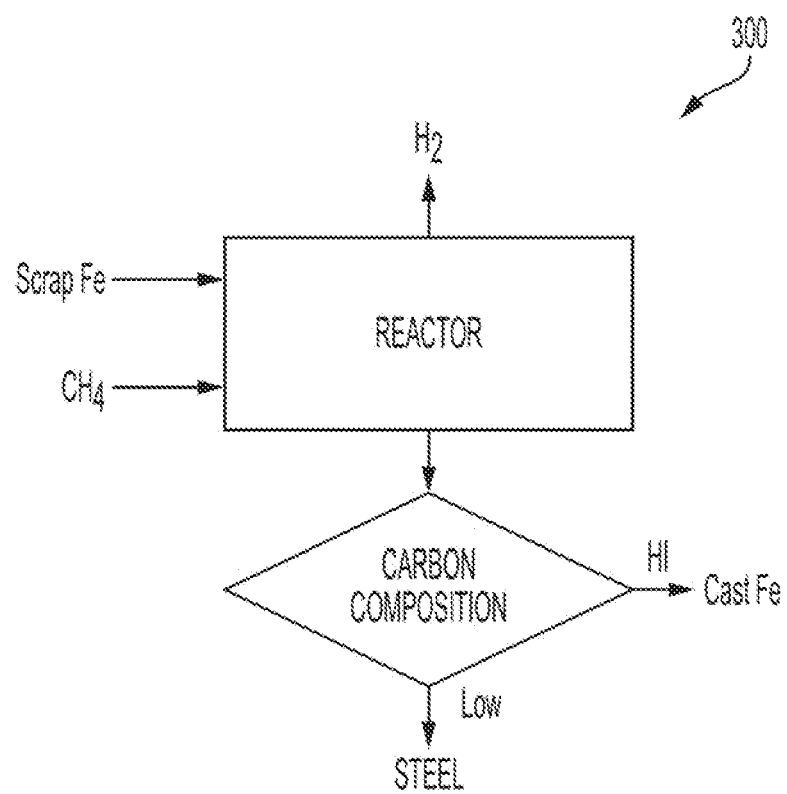
Figure 4:
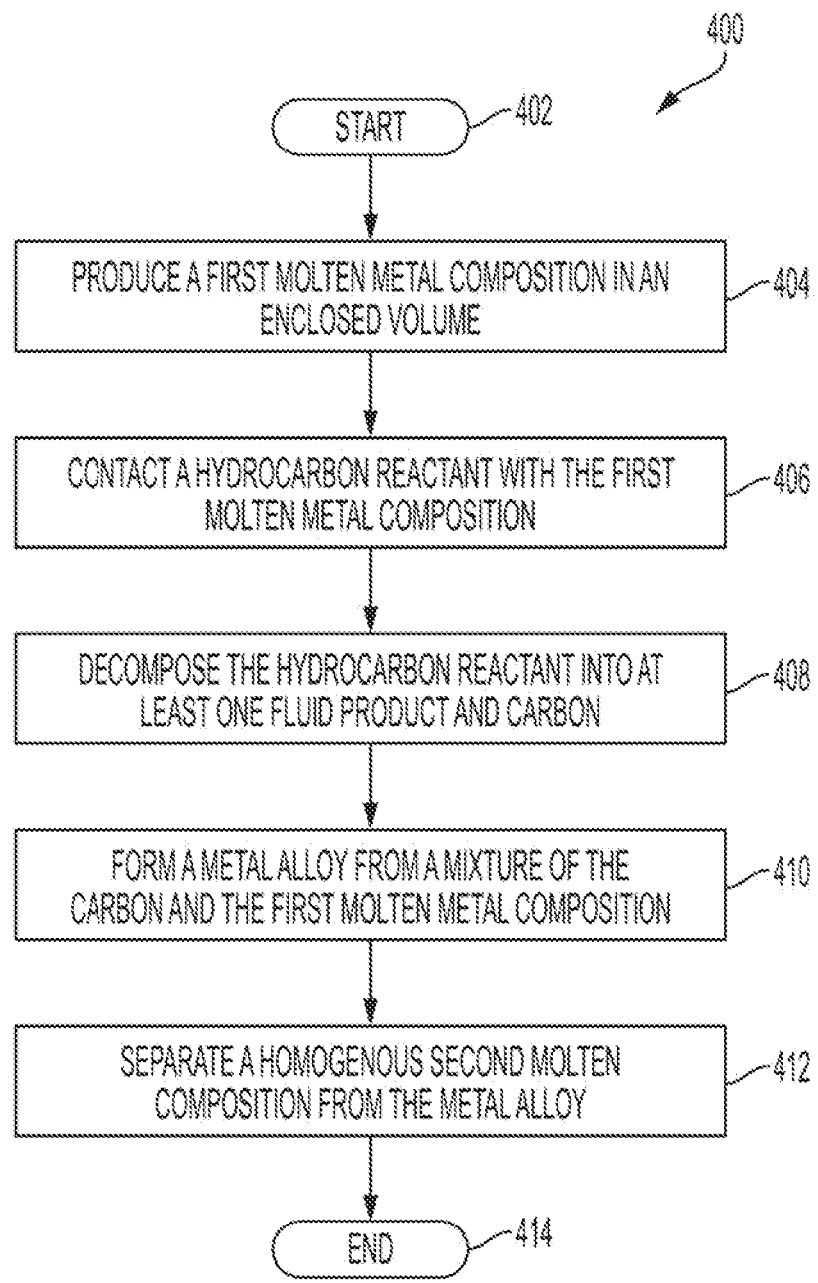

FIG. 3 illustrates a block diagram of a cost associated with a process of the present disclosure; and FIG. 4 illustrates a flowchart of an example method for producing a homogeneous molten composition and a fluid product.

To facilitate understanding, identical reference numerals have been used, where possible, to designate identical elements that are common to the figures.

DETAILED DESCRIPTION

The present disclosure is related to a process and system for steel and hydrogen production using recycled ferrous scrap and natural gas. As discussed above, there is a growing demand for $H_2$ production. However, current methods to produce $H_2$ are too expensive.

The present disclosure provides a process and reactor to produce hydrogen at a relatively low cost while also producing steel. The steel production provides lower emissions as a by-product of the steel production is hydrogen rather than carbon or coke as produced in current steel production methods described above.

For example, the present disclosure involves a reactor that decomposes a hydrocarbon feedstock (e.g., $C_xH_y$, where $x \leq y$ as in $CH_4$, $x=y$ as in $C_2H_2$ or $C_6H_6$, or $x>y$ as in $C_{14}H_{10}$) in a molten iron alloy to produce an iron-carbon alloy and hydrogen. The reaction is enabled by the use of a molten alloy reactor in which the hydrocarbon is pyrolyzed using a molten alloy catalyst to produce a carbon-saturated ternary alloy and hydrogen.

The use of a molten alloy catalyst enables a high reaction rate constant for hydrocarbon pyrolysis rate ($10^{-5}$-$10^{-9}$ mol cm$^{-2}$ s$^{-1}$ atm$^{-1}$, 1000-1500° C.), while enabling effective removal of the carbon phase. In some designs, the solid carbon phase is removed gravimetrically, and achieving effective metal-carbon separation is challenging on account of sluggish phase separation dynamics, metal inclusions in the carbon phase during settling, or condensation from vapor onto the carbon phase.

The process developed herein considerably simplifies the separation challenge. The carbon phase readily dissolves in iron to form a flowable molten phase. The ternary iron-carbon alloy may then be phase-separated into an iron-carbon phase and a first metal phase. The effective separation of the iron-carbon phase may yield a valuable co-product that may be leveraged to reduce the cost of hydrogen production. The iron-carbon phase and hydrogen may be removed from the reactor in a continuous or batch process. Thus, the present disclosure enables low-cost distributed $H_2$ production by leveraging the use of steel produced using recycled scrap at mini-mills. The reactions for the process may be summarized as:

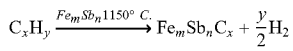

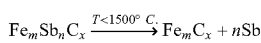

Figure 1:
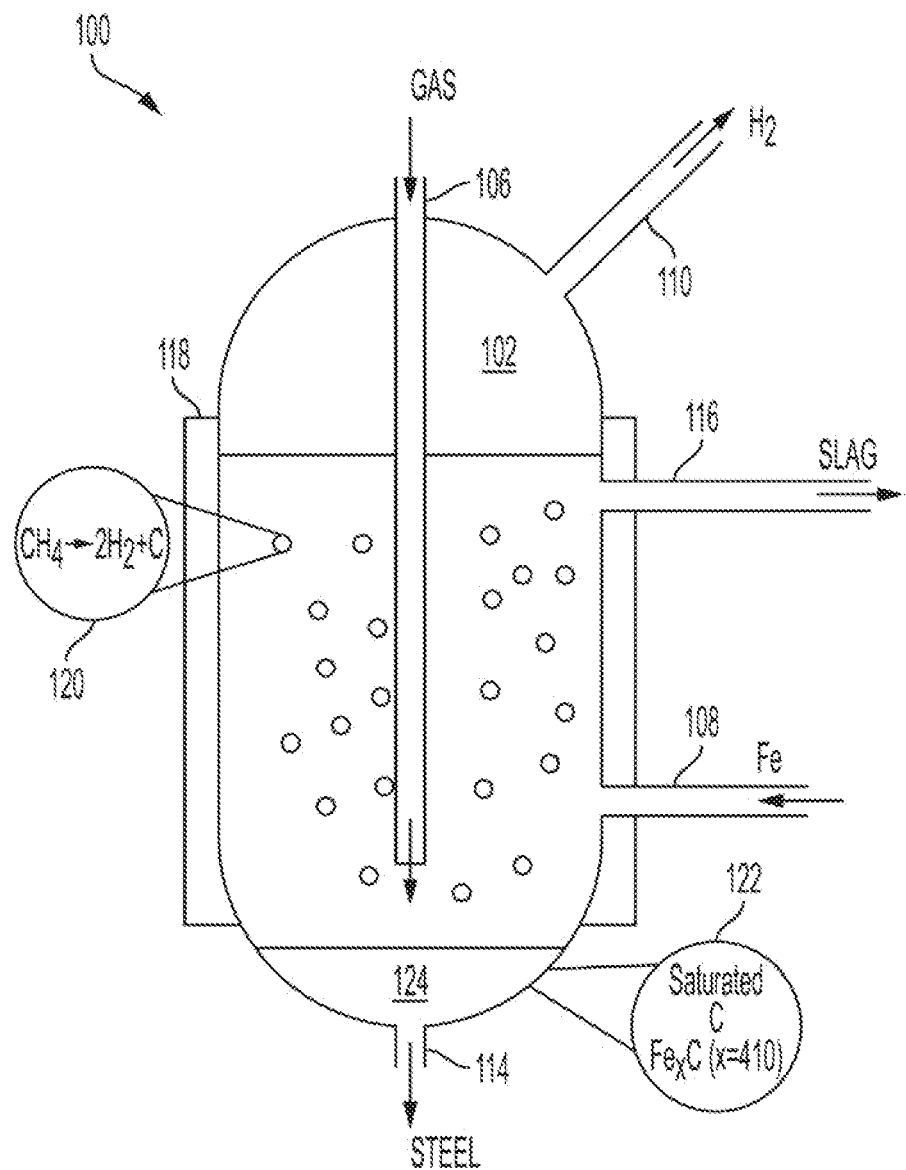
FIG. 1 illustrates a cross-sectional block diagram of an example reactor of the present disclosure.

FIG. 1 illustrates a cross-sectional block diagram of an example reactor 100 of the present disclosure. In one example, the reactor 100 may be a bubble column reactor. The reactor 100 may be operated in a continuous or batch process.

In one embodiment, the reactor 100 may include an enclosed volume 102. The body of the reactor 100 may comprise a high temperature material of construction with a liner material that is compatible with molten metals. Example materials may include Inconel, high strength steel, tungsten, or similar refractory metal.

In one example, the reactor 100 may include a heater 118. The heater 118 may comprise heating coils wrapped around the reactor 100 or heating elements that wrap around the enclosed volume 102. The heater 118 may be controlled by a controller or processor (not shown) that controls operation of the reactor 100.

In one embodiment, the enclosed volume 102 may include a metal. The metal may be a metal with a high vapor pressure to enable its rapid volatization and removal from a condensed phase. The metal may have a melting point of less than 800 degrees Celsius (° C.) and a vapor pressure of at least 1 millimeter (mm) Mercury (Hg) at 1500° C. Some examples of suitable metals may include lithium (Li), sodium (Na), potassium (K), magnesium (Mg), bismuth (Bi), zinc (Zn), lead (Pb), selenium (Se), tin (Sb), gallium (Ga), indium (In), aluminum (Al), and thallium (Tl).

The reactor 100 may include an inlet 106 and an inlet 108. The inlet 108 may be used to feed iron into the enclosed volume 102. The iron may be scrap iron. In one embodiment, the reactor 100 may also include an outlet 116. The outlet 116 may be used to remove slag or other impurities that may contain contaminants from the scrap iron. For example, the slag may include iron oxide, silica, aluminum oxide, and the like.

The iron and the metal may be heated to form a first molten alloy inside of the enclosed volume 102. The first molten alloy may comprise the iron and the metal. The first molten alloy may have an iron composition greater than 10 atomic percent, a density between 2 and 15 grams per cubic centimeter (g/cm$^3$), and a melting point between 0 and 1500° C.

In one example, the enclosed volume 102 may be heated to maintain a temperature between 500° C. to 1500° C. at a pressure of 1-10 bar. The temperature and pressure may be optimized to ensure a high gaseous product yield and throughput, as well as production and separation of an adequately saturated molten composition of the iron-carbon steel that is produced, as discussed in further details below.

The inlet 106 may be a gas lance that is used to inject a gas into the first molten alloy formed from the heated metal and iron. The gas may be a hydrocarbon gas, such as methane ($CH_4$). However, the gas may include other hydrocarbon gases that have a boiling point less than 500° C. Examples of such hydrocarbon gases may include alkanes, alkenes, alkynes, arenes, and the like.

The gas may be injected to produce a porous molten metal phase (e.g., 5%<ε<75%) with a pore size between 1 and 10,000 microns (μm). The porous molten metal phase may provide a surface area to volume ratio to achieve high rates for pyrolysis of the gas. The surface area to volume ratio may be in the range of 0.2 to 2,000 square centimeters (cm$^2$) metal surface area per cubic reactor volume (e.g., cm$^3$).

FIG. 1 illustrates an enlarged bubble 120 that shows a pyrolysis of the gas (e.g., methane). The methane gas is pyrolyzed in the presence of the first molten alloy and heated into hydrogen and carbon. The hydrogen gas may be removed via an outlet 110. The hydrogen gas can be further purified and compressed for delivery, as discussed in further details below.

The porous molten metal phase may then be stabilized by the local precipitation of a solid carbon phase from the pyrolysis of the methane gas. The solidified carbon phase may eventually dissolve into the first molten alloy to form a carbon-saturated ternary alloy (e.g., $Fe_mSb_nC_x$ when the metal is Sb) and leads to the collapse of the metal foam structure. The pyrolysis of the methane gas and the formation of the carbon-saturated ternary alloy may occur concurrently or sequentially within the reactor 100.

The local conditions in at least one portion of the reactor 100 may be controlled to ensure the separation of the steel or iron-carbon alloy that is formed. The local conditions may be achieved by local alteration of the temperature, pressure, or metal composition within the reactor. For example, FIG. 1 illustrates a bottom portion 124 where the steel is formed and an outlet 114 to remove the steel. An enlarged bubble 122 illustrates the formation of the steel or iron-carbon alloy, stoichiometrically represented as $Fe_xC$.

In one embodiment, the iron-carbon alloy may be in a liquid or solid phase. For example, the iron-carbon alloy may exist as a solid carbide ($Fe_3C$), a carbide at its eutectic composition ($Fe_4C$), a high-carbon steel ($Fe_{10}C$), as a vapor, or a ferritic steel ($Fe_{300}C$). In some embodiments, the phase of the steel (e.g., nominally represented as $Fe_mC_x$) may be described as steel (e.g., $10 \leq m \leq 1000$, $x=1$), cast iron ($3 < m < 10$, $x=1$), or carbide ($m \leq 3$, $x=1$). The steel produced in the reactor 100 may span all of the above compositions.

Additionally, the density of the steel may be either heavier or lighter than the first molten alloy. For example, the density of the steel ($\rho_{Fe_mC_x}$) may be approximately 7-8 g/cm$^3$. When the metal is aluminum the density of the first molten alloy ($\rho_{Fe_mAl_n}$) may be approximately 4.5 g/cm$^3$. When the metal is tin the density of the first molten alloy ($\Sigma_{Fe_mSb_n}$) may be approximately 8-8.5 g/cm$^3$.

Accordingly, the outlet 114 for removal of the steel may be appropriately located to ensure removal as floating or sunk layer. The steel may then be removed and processed. Processing of the steel may include heat treatments, composition modifications, or physical deformation to produce a desired steel morphology.

Figure 2:
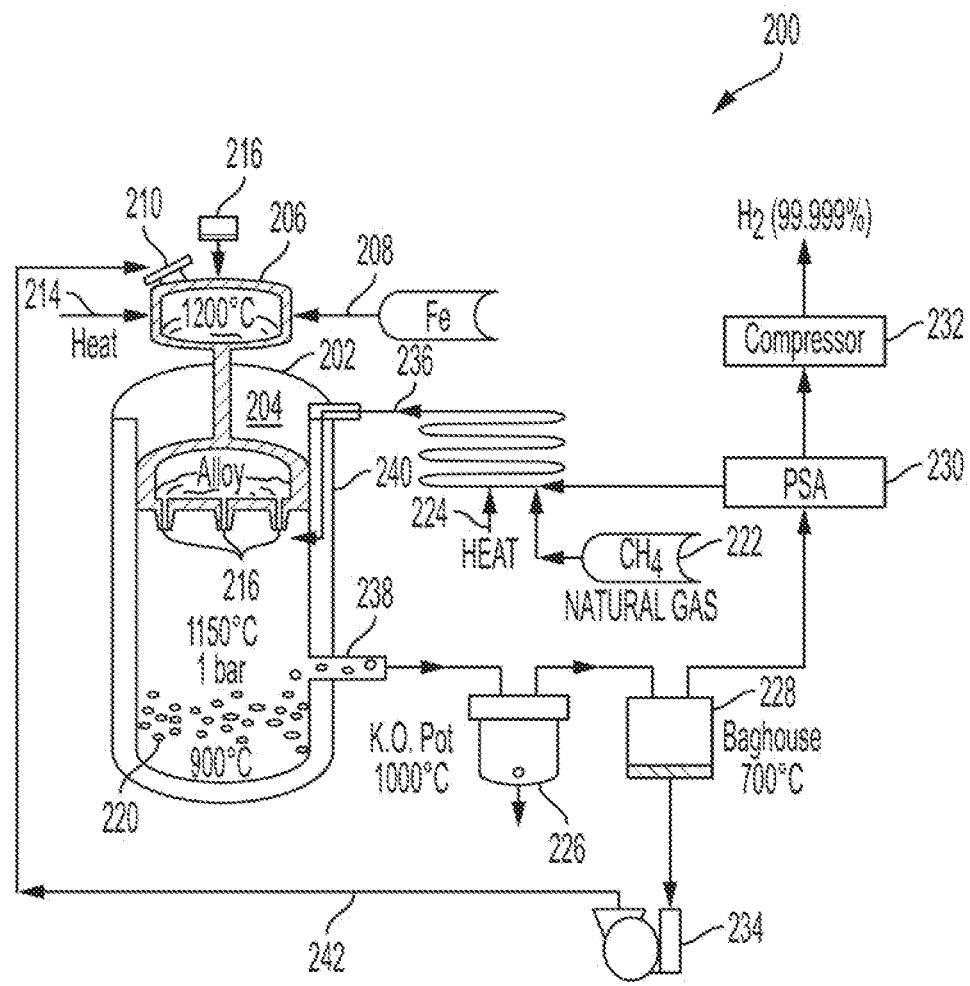
FIG. 2 illustrates a block diagram of an example reactor system of the present disclosure.

FIG. 2 illustrates an example of a reactor system 200 that may include a reactor 202. The reactor 202 may be a liquid mist reactor or a molten metal spray reactor. The reactor 202 may be operated in a continuous or batch process.

In one embodiment, the reactor 202 may include an enclosed volume 206 that includes a load port 210. The load port 210 may include a diaphragm 212 to adjust the pressure inside of the enclosed volume 206. The enclosed volume 206 may comprise a high temperature material of construction with a liner material that is compatible with molten metals. Example materials may include Inconel, high strength steel, tungsten, or similar refractory metal.

In one example, a metal may be fed through the load port into the enclosed volume 206. The metal may be similar to the types of metals described above for the reactor 100. For example, the metal may be a metal with a high vapor pressure to enable its rapid volatization and removal from a condensed phase. The metal may have a melting point of less than 800° C. and a vapor pressure of at least 1 mm Hg at 1500° C. Some examples of suitable metals may include Li, Na, K, Mg, Bi, Zn, Pb, Se, Sb, Ga, In, Al, and Tl.

The reactor 202 may include an inlet 208 to the enclosed volume 206 to feed iron. The iron may be scrap iron. The iron and the metal may be heated inside of the enclosed volume 206 via heat source 214. In one example, the iron and the metal may be heated to between 500 to 1500° C. In one example, the iron and the metal may be heated at approximately 1200° C. to form a first molten alloy that comprises the iron and the metal.

In one embodiment, the reactor 202 may include an enclosed volume 204. The enclosed volume 204 may include nozzles 216 that spray the first molten alloy into the enclosed volume 204. A hydrocarbon gas 222 may also be fed into the enclosed volume 204 via an inlet 236 in a continuous gas phase. In one embodiment, the inlet 236 may be heated via a heat source 224 to maintain the gas phase of the hydrocarbon gas 222. Although the hydrocarbon gas 222 is illustrated as being methane in FIG. 2, it should be noted that other hydrocarbon gases can be used. As noted above, any hydrocarbon gas that has a boiling point less than 500° C. can be used, such as alkanes, alkenes, alkynes, arenes, and the like.

In one embodiment, the nozzles 216 may ensure that the first molten alloy is dispersed as a spray with a sufficiently high surface area to volume ratio. The surface area to volume ratio may be approximately 0.2 to 20,000 cm$^2$ per cubic volume (cm$^3$) of the reactor 202. In one embodiment, the inlet 236 may be appropriately located relative to the nozzles 216 based on a desired counter-flow, co-current flow, or cross-flow operation.

The enclosed volume 204 may be heated via a heater 240. The heater 240 may be heating coils that are wrapped around the enclosed volume 204 or heating elements that surround the enclosed volume 204. The heater 240, the heat source 214, and the heat source 224 may be controlled independently by a controller or processor (not shown) that controls operation of the reactor system 200.

In one embodiment, the heater 240 may heat the enclosed volume 204 to between 500 to 1500° C. at 1-2 bars of pressure. In one embodiment, the enclosed volume 204 may be heated to 1150° C. at 1 bar.

Similar to the reactor 100 and described above, the hydrocarbon gas 222 may undergo a pyrolysis in the presence of the heat and the first molten alloy. The hydrocarbon gas 222 may decompose into hydrogen gas and carbon.

As described above, the carbon may dissolve into the first molten alloy to form a carbon-saturated ternary alloy. The local conditions in a portion of the reactor 202 may be controlled to ensure separation of the steel or iron-carbon alloy that is formed. In one embodiment, a bottom portion 220 of the reactor 202 may be locally controlled to have a lower temperature of approximately 900° C. For example, the heater 240 may have independently controlled zones to provide different amounts of heat or the bottom portion 220 of the reactor 202 may have a separate heater. The carbon-saturated ternary alloy and hydrogen gas may be removed via an outlet 238 for further processing and separation.

In one embodiment, the reactor system 200 may include a knock-out pot 226. The knock-out pot 226 may be used to evaporate the first metal out of the carbon-saturated ternary alloy and recover the solid steel that is formed. The solidified steel or iron-carbon alloy may have a nominal diameter between approximately 1 and 1,000 μm.

The hydrogen gas and the evaporated metal may flow out of the knock out pot 226 into a baghouse filter 228. Although a baghouse filter 228 is shown, it should be noted that a cold finger or condenser may also be used instead of the baghouse filter 228.

The baghouse filter 228 may filter out the evaporated metal from the hydrogen gas. For example, the baghouse filter 228 may be kept at a temperature that maintains the hydrogen in a gas phase, but condenses the metal. The metal may then be recycled back to the load port 210 and the enclosed volume 206 via a recirculation line 242. The recirculation line 242 may include a pump 234. The pump 234 may be a molten metal pump.

The hydrogen gas may flow out of the baghouse filter to an adsorber column 230. The adsorber column 230 may be either a pressure swing adsorption (PSA) column as shown in FIG. 2 or a temperature swing adsorption (TSA) column. The adsorber column 230 may purify the hydrogen gas to greater than 99.999% pure hydrogen gas.

The purified hydrogen gas may then be fed to a compressor 232. The compressor 232 may compress the purified hydrogen gas to above atmospheric pressure and up to 20 bar. The compressed hydrogen gas may then be transported.

Thus, FIGS. 1 and 2 provide example reactors and reactor systems that can be used to produce steel and hydrogen gas, as described above. FIG. 3 illustrates a block diagram 300 of a value proposition of the methods described herein. The block diagram 300 illustrates the input costs and the value of the outputs.

For example, scrap iron from steel minimills or blast oxygen furnace steel mills could provide 150 metric tons (Mt) per year (y) of scrap iron at approximately $200 per tonne. The cost of the methane gas may be approximately $3 per gigajoule (GJ). Approximately 5.7 Mt/y of methane gas may be used.

However, the input costs may be offset by the value of the approximately 1.2 Mt/y of hydrogen gas that is produced and sold at greater than $2 per gasoline gallon equivalent (gge). Also, approximately 120 Mt/y of steel can be produced and sold at $700 per tonne or approximately 30 Mt/y of cast iron can be produced and sold at $400 per tonne. For example, if the carbon composition of the product from the reactor is high in carbon composition then the product may be sold as cast iron. If the carbon composition of the product from the reactor is low in carbon composition then the product may be sold as steel. Thus, the reactors 100 and 200 using the processes described above may provide value of approximately $1000 t/y in steel and hydrogen production.

Thus, the reactor 100 and the reactor system 200 may provide a process that can produce hydrogen gas at costs that are similar to or lower than hydrogen gas produced using currently available methods. In addition, steel and cast iron can be produced with lower carbon emissions than current steel mills.

The pyrolysis of the hydrocarbon gas can be used also for gasoline and steel co-production where the gaseous product is a heavier molecular weight than the hydrocarbon reactant. In one embodiment, the process of the present disclosure may also include a hydrocarbon gaseous product with a lower molecular weight than the hydrocarbon reactant gas. Examples for the co-production of lower molecular weight hydrocarbons may include:

$$2C_2H_6 + Fe_mSb_n \rightarrow Fe_mC + nSb + 3CH_4$$

$$C_2H_4 + Fe_mSb_n \rightarrow Fe_mC + nSb + CH_4$$

$$2C_2H_2 + Fe_mSb_n \rightarrow Fe_mC_3 + nSb + CH_4$$

Examples for the co-production of longer chain hydrocarbons (e.g., $C_2$ to $C_{10}$) may include:

$$3CH_4 + Fe_mSb_n \rightarrow Fe_mC + nSb + C_2H_6 + 3H_2$$

$$3CH_4 + Fe_mSb_n \rightarrow Fe_mC + nSb + C_2H_4 + 4H_2$$

$$3CH_4 + Fe_mSb_n \rightarrow Fe_mC + nSb + C_2H_2 + 5H_2$$

In some embodiments, this process might be used for the co-production of steel and liquid fuels produced using octane, methane, ethane, propane, or butane as example hydrocarbon reactants. Examples of this may include:

$$9CH_4 + Fe_mSb_n \rightarrow Fe_mC + nSb + C_8H_{18} + 9H_2$$

$$5C_2H_6 + Fe_mSb_n \rightarrow Fe_mC + nSb + C_8H_{18} + CH_4 + 4H_2$$

$$3C_3H_8 + Fe_mSb_n \rightarrow Fe_mC + nSb + C_8H_{18} + 3H_2$$

$$3C_4H_{10} + Fe_mSb_n \rightarrow Fe_mC + nSb + C_8H_{18} + C_3H_8 + 2H_2$$

FIG. 4 illustrates a flowchart of an example method 400 for producing a homogeneous molten composition and a fluid product. In one embodiment, one or more steps or operations of the method 400 may be performed by the reactor 100 or the reactor system 200.

At block 402, the method 400 begins. At block 404, the method 400 produces a first molten metal composition in an enclosed volume. For example, the first molten metal composition may be scrap iron and a metal that is melted via heat inside of the enclosed volume. The scrap iron may be purified to remove slag (e.g., iron oxide, silica, aluminum oxide, and the like). The metal may be a metal with a boiling point of less than 800° C. and a vapor pressure of at least 1 mm Hg at 1500° C. The metal may also have high carbon solubility that can be eventually phase separated out. Examples of the metals may include iron, nickel, manganese, cobalt, scandium, or lanthanum.

In one embodiment, the scrap iron and the metal inside the enclosed volume may be heated to produce the first molten metal composition. In one example, the iron and the metal may be heated to between 500° C. and 1500° C. at 1-10 bar of pressure. In one example, the iron and the metal may be heated at approximately 1150° C. at 1 bar to form the first molten metal composition.

At block 406, the method 400 contacts a hydrocarbon reactant with the first molten metal composition. In one embodiment, the hydrocarbon reactant may be a gas such as methane. However, it should be noted that any hydrocarbon gas that has a boiling point less than 500° C. can be used, such as alkanes, alkenes, alkynes, arenes, and the like. In one example, the hydrocarbon reactant may be a hydrocarbon fuel such as methane, ethane, propane or butane and the desired compound may be a liquid fuel.

At block 408, the method 400 decomposes the hydrocarbon reactant into at least one fluid product and carbon. In one embodiment, the hydrocarbon reactant is decomposed (e.g., pyrolyzed) in the presence of heat and the first molten metal composition. The hydrocarbon reactant can be decomposed into the fluid product (e.g., hydrogen gas, a hydrocarbon, or a liquid fuel) and carbon. When the fluid product is hydrogen gas, the hydrogen gas can be removed, purified, and compressed, as described above.

At block 410, the method 400 forms a metal alloy from a mixture of the carbon and the first molten metal composition. In one embodiment, the metal alloy may comprise the scrap iron and the metal from the first molten metal composition, and carbon. The carbon may be precipitated in a solid carbon phase from the pyrolysis of the hydrocarbon reactant. The solidified carbon phase may eventually dissolve into the iron-containing molten alloy to form a second metal alloy of a carbon-saturated ternary alloy (e.g., $Fe_mSb_nC_x$ when the metal is Sb).

At block 412, the method 400 separates a homogenous second molten composition from the metal alloy. The homogeneous second molten composition may be steel, cast iron, iron carbide, or nickel carbide based on the amount of carbon in the homogenous second molten composition. For example, the metal may be evaporated out of the carbon saturated ternary alloy to form the homogenous second molten composition or iron-carbon alloy. The metal may be solidified and recycled back into the enclosed volume through a recirculation line as part of a continuous reactor process.

The homogenous second molten composition may be steel that can be formed as a liquid, solid, gas, or any combination thereof, as described above. The homogenous second molten composition may then be processed as desired. Processing of the iron-carbon alloy may include heat treatments, composition modifications, or physical deformation to produce a desired steel morphology. At block 414, the method 400 ends.

It should be noted that the blocks in FIG. 4 that recite a determining operation or involve a decision do not necessarily require that both branches of the determining operation be practiced. In other words, one of the branches of the determining operation can be deemed as an optional step. In addition, one or more steps, blocks, functions or operations of the above described method 400 and may comprise optional steps, or can be combined, separated, and/or performed in a different order from that described above, without departing from the example embodiments of the present disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A reactor to produce steel and hydrogen, the reactor comprising:
    an enclosed volume;
    a first inlet to feed a metal composition into the enclosed volume;
    a second inlet to feed a hydrocarbon reactant into the enclosed volume;
    a heat source to melt the metal composition into a first molten metal composition and to decompose the hydrocarbon reactant into at least one fluid product and carbon, wherein the first molten metal composition comprises iron and a metal, wherein the metal comprises at least one of: iron, nickel, manganese, cobalt, scandium, or lanthanum, wherein a metal alloy is formed from a mixture of the carbon and the first molten metal composition, and wherein a homogenous second molten composition is separated from the metal alloy;
    a second enclosed volume, wherein the second inlet is coupled to the second enclosed volume;
    a plurality of nozzles coupled to a bottom of the enclosed volume, wherein the first molten metal composition is dispersed into the second enclosed volume with the hydrocarbon reactant, wherein the first molten metal composition is dispersed at a range of 0.2 to 20,000 square centimeters of a surface area of the first molten metal composition per cubic centimeter of a volume of the second enclosed volume; and
    a second heat source to heat the second enclosed volume and to maintain a temperature between 500 degrees Celsius (° C.) to 1500° C.

2. The reactor of claim 1, wherein the metal has a boiling point of less than 800 degrees Celsius (° C.) and a vapor pressure of at least 1 millimeter (mm) Hg at 1500° C.

3. The reactor of claim 1, wherein the homogeneous second molten composition comprises steel, cast iron, iron carbide, or nickel carbide and the at least one fluid product comprises hydrogen.

4. The reactor of claim 1, wherein the hydrocarbon reactant comprises at least one of: an alkane gas, an alkene gas, an alkyne gas, or an arene gas.

5. The reactor of claim 1, further comprising an outlet to remove slag.

6. The reactor of claim 1, further comprising an outlet to remove hydrogen gas.

7. The reactor of claim 1, further comprising:
    a knock-out pot to recover the homogeneous second molten composition.

8. The reactor of claim 7, further comprising:
    a baghouse filter to recover a metal in gas form when separated from the metal alloy.

9. The reactor of claim 8, further comprising:
    a recirculation line coupled from the baghouse filter to the enclosed volume.

10. The reactor of claim 9, further comprising:
    a pump to recirculate the metal in gas form from the baghouse filter to the enclosed volume via the recirculation line.

11. The reactor of claim 1, further comprising:
    an adsorber column to purify the at least one fluid product; and
    a compressor to compress the at least one fluid product.

12. The reactor of claim 1, wherein the first inlet and the second inlet are positioned to provide a counter-flow, a co-current flow, or a cross-flow operation.

13. The reactor of claim 1, wherein the reactor comprises a bubble-column reactor or a spray reactor.

14. The reactor of claim 1, wherein the reactor is operated in a continuous process or a batch process.

15. The reactor of claim 1, further comprising:
    a controller communicatively coupled to the heat source to control the heat source to heat the enclosed volume to between 500 degrees Celsius to 1500 degrees Celsius at 1-2 bars of pressure.

16. The reactor of claim 1, wherein the heat source has independently controlled zones to heat a first portion of the enclosed volume to a first temperature and to heat a second portion of the enclosed volume to a second temperature.

* * * * *